(No Model.)
H. B. & C. H. FISCHER.
APPARATUS FOR FILTERING WINE.
No. 430,120. Patented June 17, 1890.
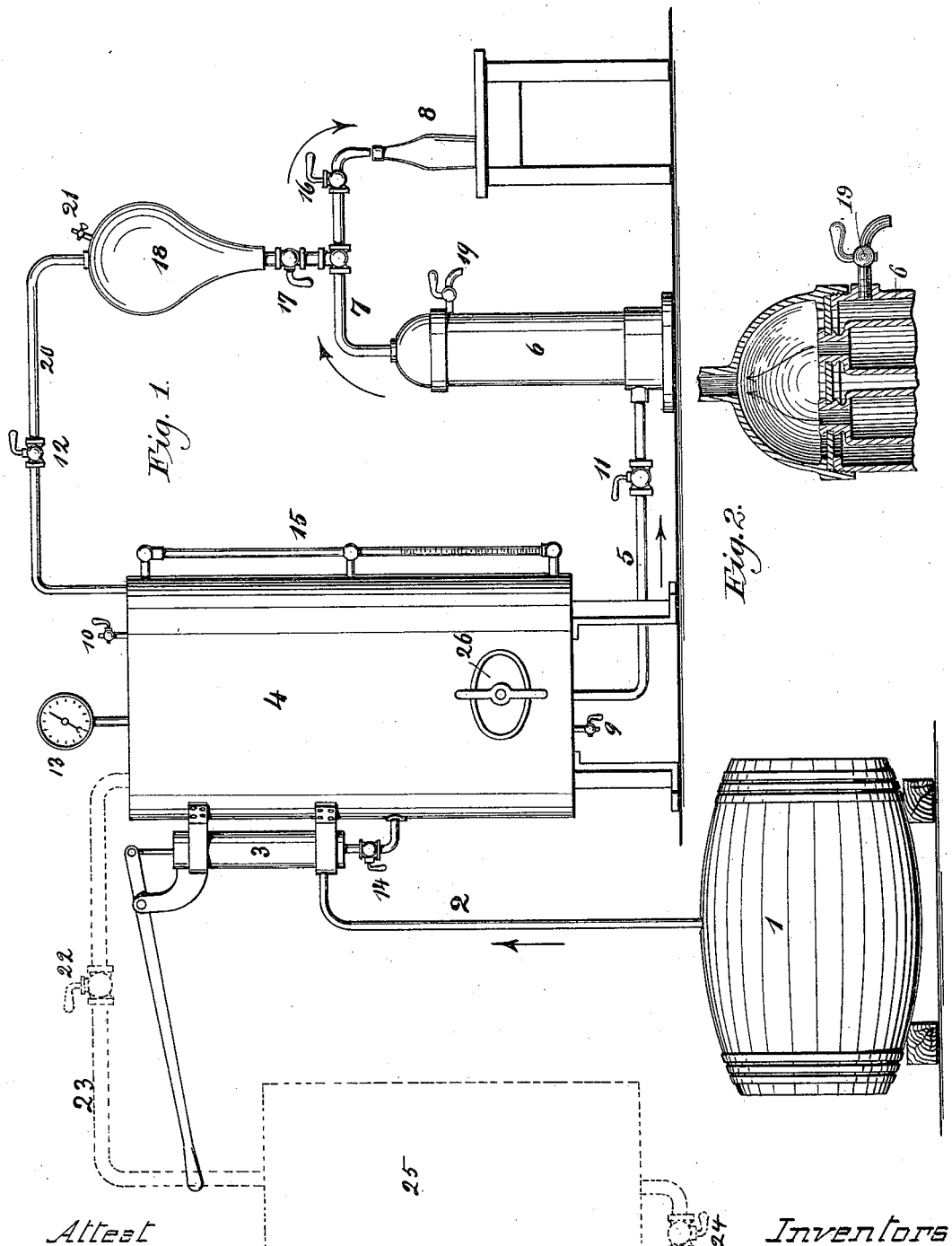

UNITED STATES PATENT OFFICE.

HENRY B. FISCHER AND CHARLES H. FISCHER, OF CINCINNATI, OHIO.

APPARATUS FOR FILTERING WINE.

SPECIFICATION forming part of Letters Patent No. 430,120, dated June 17, 1890.

Application filed May 13, 1889. Serial No. 310,625. (No model.)

*To all whom it may concern:*

Be it known that we, HENRY B. FISCHER and CHARLES H. FISCHER, citizens of the United States, residing at Cincinnati, in the county of Hamilton and State of Ohio, have invented certain new and useful Improvements in Apparatus for Filtering Wine; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to wine-filters; and the object is to provide a filtering apparatus which, while doing the work perfectly, does it so quick as to make the filter adaptable for use in the wholesale wine trade.

It often happens from different causes that wine while in barrels gets cloudy, and in such condition it cannot be filled off in bottles, as it would not be marketable.

The use of ordinary filters not working under pressure is entirely out of question in a wholesale house where a good deal of bottling is to be done, for the reason that they are entirely too slow. Filters on the Pasteur filter order, wherein the fluid is pressed through porcelain tubes, are very good filters, but heretofore could only be used for water under pressure, as in city water-service pipes. To construct an apparatus which enables us to use this class of filters, which we prefer for the purpose of filtering wine which is not under pressure, in combination with means to clean said filter readily with the same liquid which passes through it, thereby obviating the introduction of another liquid (water, for instance) into the apparatus, and preventing the interruption of the whole process for the longer time thus necessary, has been our aim, and we attain it by a construction explained below and illustrated in the accompanying drawings, in which—

Figure 1 is a general view of our apparatus, and Fig. 2 is a vertical section of the filter proper.

1 is a wine-barrel to be bottled off.

2 is a connecting-pipe leading to a force-pump 3, attached to a large tank 4.

5 is another pipe, leading to the filter 6, and 7 is the discharge-pipe emptying the wine into the bottle 8.

At the beginning tank 4 is empty and filled with air. All outlets—such as try-cocks 9 10 and cocks 11 and 12—are closed. By means of the force-pump 3 the wine is pumped from the barrel and pressed into the tank. The air on top of the wine is of course greatly compressed, and the forcing is kept up till a desired point of pressure is shown at the indicator 13, when the action of the pump is stopped, cock 14 closed, and cock 11 opened. The wine is now pressed out through pipe 5, filter 6, and discharged through 7. When the air in the tank has so nearly expanded that the force is unable to put the liquid through the filter, the pumping process is resumed again, as before explained, and with two or three such operations a barrel is generally filtered.

15 is a glass gage, showing the height of the wine.

After using our apparatus for some time it is desirable to clean it, which is best done by pressing fluid through the filter in opposite direction to the general use, whereby all sediments in the pores of the tubes in the filter are easily loosened and carried away. For better understanding this it might be proper to mention here that the liquid to be filtered, entering the filter through its outer shell, is forced into a number of porcelain or similar tubes, closed on their lower ends, and which tubes it enters through their pores, from whence it passes out on top and on to the final outlet. We do this as follows: Before the pressure in tank 4 is entirely exhausted we close faucet 16 and open cock 17, when the wine is forced into the air-chamber 18, compressing the air therein. After sufficient compression cock 11 is closed, faucet 19 opened, when the compressed air in chamber 18 will press the wine backward through the filter, loosening the impurities and carrying them off through faucet 19. A gallon or two of the wine, passing through backward, generally does the cleaning, and may be caught at the outlet and put back again into the barrel or otherwise utilized. Should the pressure in chamber 18 sometimes be not sufficient, cock 12 may be opened, letting some of the compressed air in tank 4 pass over through pipe 20, thereby assisting the forcing out of the liquid. 21 is an air-cock in the chamber 18. In this manner the filter is cleaned without the introduction of a different liquid—as water, for instance—being necessary, and thereby obviating the longer stoppage of the process necessary to do this.

When city-water pressure can be had, it may be used for the purpose of compressing the air in place of the pump.

The different construction and operation in this case are as follows, (see dotted lines in the drawings:) Tank 4 is filled with wine. Cock 22 in pipe 23 is closed. Cock 24 is opened, allowing water under pressure to rush in tank 25, filled now with air. After sufficient pressure has been attained cock 24 is closed and 22 opened, allowing the compressed air to rush on top of the wine in tank 4, and pressing it through the filter, the same as explained before.

26 is a man-hole in tank 4, permitting access to the same for the purpose of inspecting, repairs, and so on.

We are aware of the existence of filters, and also know that it is not new to compress air in tanks on top of liquids in order to force the same out, and therefore do not claim these features broadly. What we do claim, however, is the combination and arrangement of all parts described in such a manner as to enable us to use, in a profitable and practicable way, a filter of the description mentioned, and for the purpose stated at the beginning.

We claim—

In a filtering apparatus, the combination, with the elevated supply-tank containing the liquid to be filtered under pressure and having a tube-filter connected to it, of the attachment intended for cleaning said filter with the same liquid which is contained in the supply-tank, and consisting of outlet-pipe 7, cock 16, whereby the same is closed, and cock 19, which is opened during the cleaning operation, and air-chamber 18, with connecting-pipe 20, all as shown, and for the purposes explained.

In testimony whereof we affix our signatures in presence of two witnesses.

HENRY B. FISCHER.
CHARLES H. FISCHER.

Witnesses:
CARL SPENGEL,
FRANCIS M. BIDDLE.